US012609894B2

(12) United States Patent
Ganesan et al.

(10) Patent No.: US 12,609,894 B2
(45) Date of Patent: Apr. 21, 2026

(54) SYSTEMS AND METHODS FOR PEER LINK-LESS MULTI-CHASSIS LINK AGGREGATION GROUP (MC-LAG) IN A NETWORK

(71) Applicant: DELL PRODUCTS L.P., Round Rock, TX (US)

(72) Inventors: Senthil Kumar Ganesan, San Ramon, CA (US); Venkatesan Mahalingam, Pleasanton, CA (US); Vinoth Kumar Arumugam, Fremont, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 530 days.

(21) Appl. No.: 18/157,668

(22) Filed: Jan. 20, 2023

(65) Prior Publication Data

US 2024/0250901 A1 Jul. 25, 2024

(51) Int. Cl.
| | |
|---|---|
| *H04L 12/66* | (2006.01) |
| *H04L 45/00* | (2022.01) |
| *H04L 45/24* | (2022.01) |
| *H04L 45/28* | (2022.01) |

(52) U.S. Cl.
CPC ............ *H04L 45/32* (2013.01); *H04L 45/245* (2013.01); *H04L 45/28* (2013.01)

(58) Field of Classification Search
CPC ..... H04L 45/245; H04L 45/745; H04L 45/66; H04L 41/12; H04L 12/4641; H04L 45/04; H04L 45/02; H04L 45/28; H04L 12/4633; H04L 45/24; H04L 47/125; H04L 49/25;

H04L 45/16; H04L 67/1097; H04L 45/22; H04L 41/0853; H04L 41/0894; H04L 41/0895; H04L 49/70; H04L 45/48; H04L 63/0272; H04L 12/44; H04L 49/354
See application file for complete search history.

(56) References Cited

U.S. PATENT DOCUMENTS

| | | | | |
|---|---|---|---|---|
| 10,142,129 | B1 * | 11/2018 | Gupta | ..................... H04L 45/66 |
| 2010/0157844 | A1 * | 6/2010 | Casey | ..................... H04L 45/03 |
| | | | | 370/254 |
| 2016/0337272 | A1 * | 11/2016 | Berman | .................. H04L 49/70 |
| 2017/0257309 | A1 * | 9/2017 | Appanna | ............. H04L 12/4641 |

(Continued)

*Primary Examiner* — Kharye Pope
(74) *Attorney, Agent, or Firm* — BAUGH LAW, LLC

(57) ABSTRACT

Current data center deployments, particularly layer 2 (L2) deployments that use multi-chassis link aggregation group (MC-LAG) implementations, have limitations. Such deployments use a link, known as an inter-node link (INL)/inter-chassis link (ICL), to connect peer information handling system nodes. Because the peer nodes are coupled together via one or more INL connections, there are fewer ports available for each peer node to connect to end nodes. This configuration creates limitations to bandwidth and scaling, and also increases costs. Embodiments herein allow for the elimination of INLs by moving forwarding decisions to the spine node level. In one or more embodiments, a spine node determines ports to reach dual-homed, single-homed, and orphaned nodes that are connected to leaf node(s) based on information learned from the leaf nodes. For a leaf node, a sub-LAG (link aggregation group) may be created to reach single-homed/orphaned nodes connected to the leaf node.

20 Claims, 15 Drawing Sheets

(56) References Cited

U.S. PATENT DOCUMENTS

| | | | | |
|---|---|---|---|---|
| 2018/0351791 A1* | 12/2018 | Nagarajan | ........... | H04L 12/4641 |
| 2018/0351855 A1* | 12/2018 | Sood | ........................ | H04L 45/28 |
| 2019/0007301 A1* | 1/2019 | Kadosh | ................... | H04L 45/48 |
| 2019/0379582 A1* | 12/2019 | Johnsen | ................ | H04L 49/358 |
| 2020/0322267 A1* | 10/2020 | Li | ........................... | H04L 45/04 |
| 2020/0351185 A1* | 11/2020 | Kalburgi | ................. | H04L 43/50 |
| 2023/0073266 A1* | 3/2023 | Boutros | ................. | H04L 45/48 |
| 2024/0235999 A1* | 7/2024 | Zhang | ................... | H04L 45/02 |

* cited by examiner

<u>300</u>

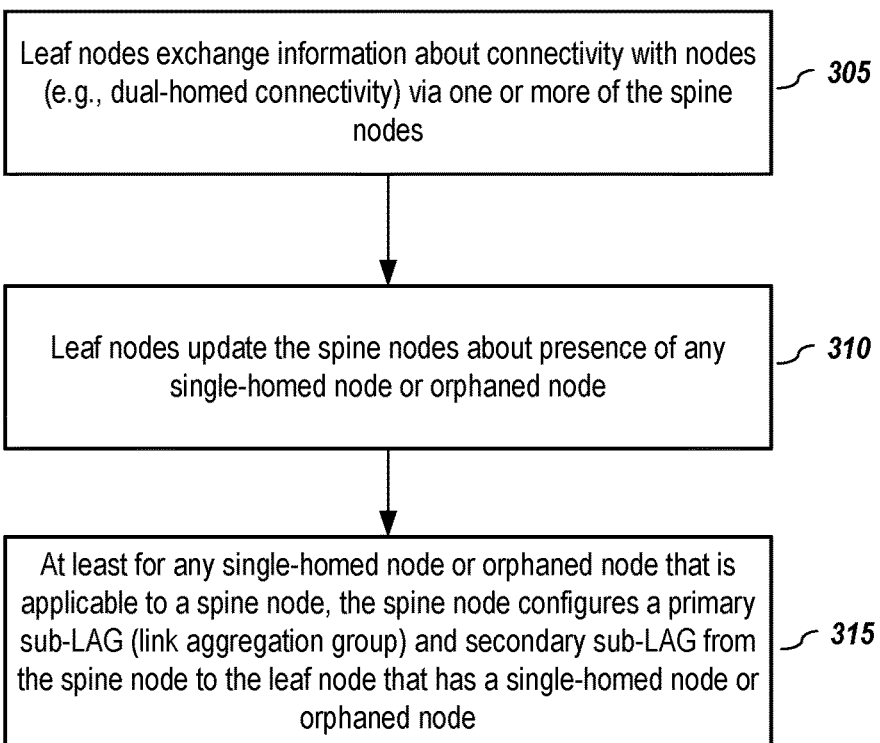

Leaf nodes exchange information about connectivity with nodes (e.g., dual-homed connectivity) via one or more of the spine nodes    305

Leaf nodes update the spine nodes about presence of any single-homed node or orphaned node    310

At least for any single-homed node or orphaned node that is applicable to a spine node, the spine node configures a primary sub-LAG (link aggregation group) and secondary sub-LAG from the spine node to the leaf node that has a single-homed node or orphaned node    315

FIG. 3

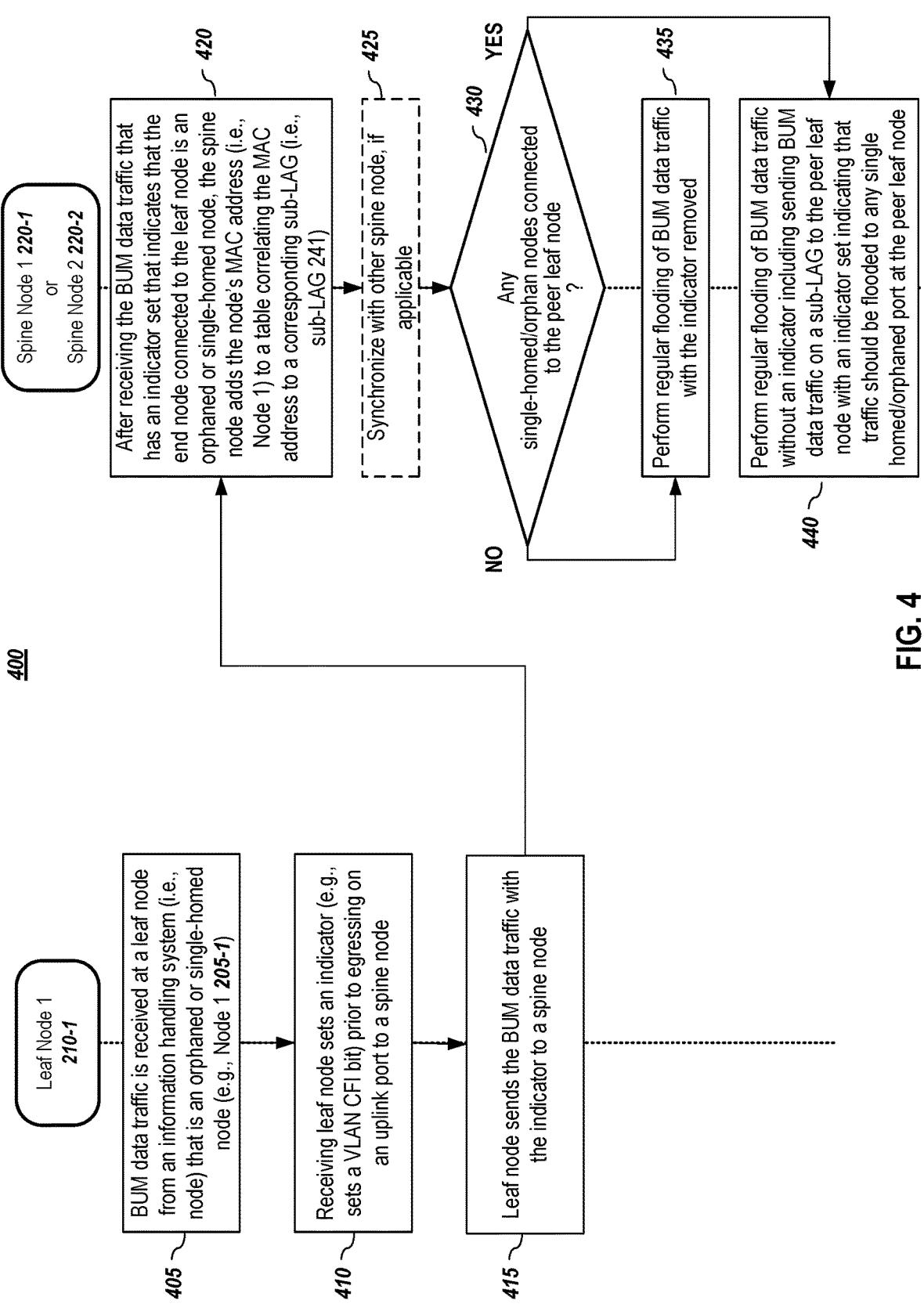

400

Leaf Node 1
210-1

405 — BUM data traffic is received at a leaf node from an information handling system (i.e., node) that is an orphaned or single-homed node (e.g., Node 1 205-1)

410 — Receiving leaf node sets an indicator (e.g., sets a VLAN CFI bit) prior to egressing on an uplink port to a spine node

415 — Leaf node sends the BUM data traffic with the indicator to a spine node Spine Node 1 220-1
or
Spine Node 2 220-2

420 — After receiving the BUM data traffic that has an indicator set that indicates that the end node connected to the leaf node is an orphaned or single-homed node, the spine node adds the node's MAC address (i.e., Node 1) to a table correlating the MAC address to a corresponding sub-LAG (i.e., sub-LAG 241)

425 — Synchronize with other spine node, if applicable

430 — Any single-homed/orphan nodes connected to the peer leaf node ?

NO

YES

435 — Perform regular flooding of BUM data traffic with the indicator removed

440 — Perform regular flooding of BUM data traffic without an indicator including sending BUM data traffic on a sub-LAG to the peer leaf node with an indicator set indicating that traffic should be flooded to any single homed/orphaned port at the peer leaf node

FIG. 4

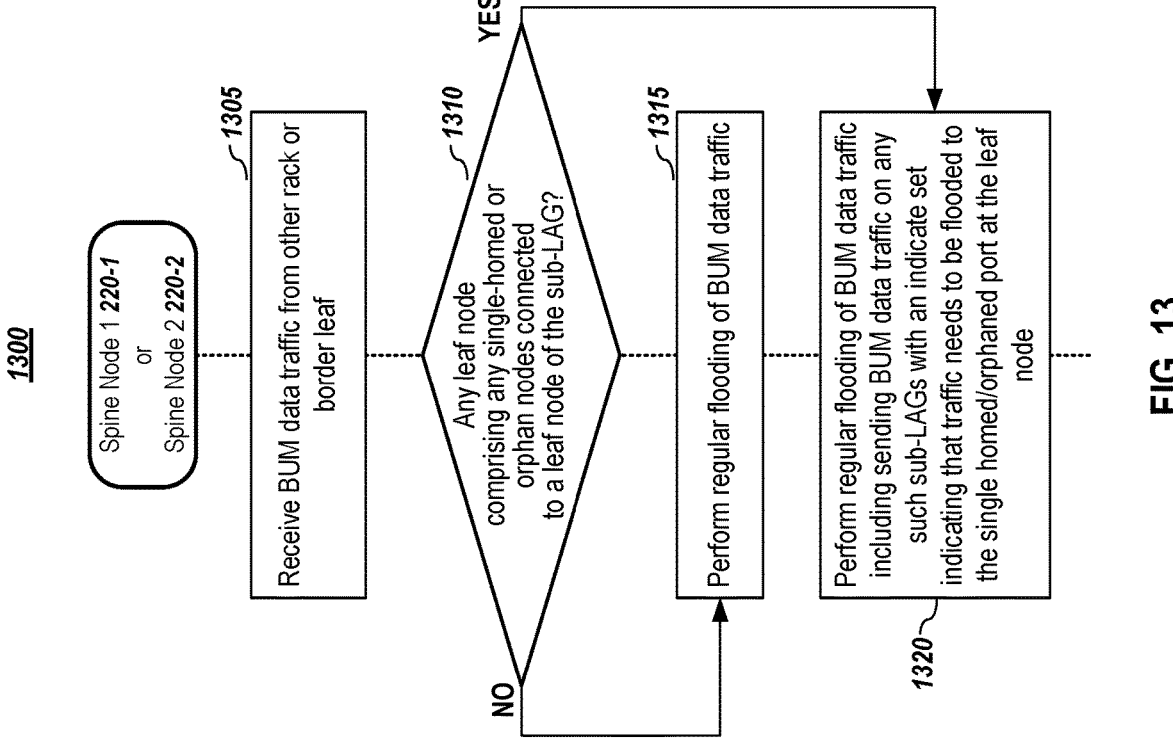

_1300_

Spine Node 1 _220-1_
or
Spine Node 2 _220-2_

_1305_

Receive BUM data traffic from other rack or border leaf

_1310_

Any leaf node comprising any single-homed or orphan nodes connected to a leaf node of the sub-LAG?

NO

YES

_1315_

Perform regular flooding of BUM data traffic

_1320_

Perform regular flooding of BUM data traffic including sending BUM data traffic on any such sub-LAGs with an indicate set indicating that traffic needs to be flooded to the single homed/orphaned port at the leaf node

SYSTEMS AND METHODS FOR PEER LINK-LESS MULTI-CHASSIS LINK AGGREGATION GROUP (MC-LAG) IN A NETWORK

BACKGROUND

A. Technical Field

The present disclosure relates generally to information handling systems. More particularly, the present disclosure relates to implementing peer link-less networks.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Current data center deployments, particularly layer 2 (L2) deployments that use multi-chassis link aggregation group (MC-LAG) implementations to achieve multi-homing connectivity for information handling systems, such as servers and storage, have several limitations. Such implementations use a link to connect peer information handling system nodes. Consider, by way of illustration, the network depicted in FIG. 1.

FIG. 1 illustrates a network comprising a spine layer 121, several pairs of leaf nodes 140, 145, and 150, and several nodes 105-x connected thereto. In the depicted embodiment, the spine layer 121 comprises two information handling systems operating as spine nodes 120. The spine nodes 120 are peers and are connected via an inter-node link (INL) or inter-chassis link (ICL) 122, which allows the spine nodes 120-1 and 120-2 to communicate or pass management information and data traffic to each other.

Depicted below the spine layer 121 are sets of peer leaf nodes 140, 145, and 150. In the depicted example, each set of peer leaf nodes comprises two information handling systems acting as leaf nodes 110/115 in the network topology. For example, peer leaf nodes 140 comprise Leaf Node 1 110-1 and Leaf Node 2 110-2. Like the spine nodes 120, the peer leaf nodes 110/115 are connected via an INL—i.e., link 172 for peer leaf nodes 140, link 174 for peer leaf nodes 145, and link 176 for peer leaf nodes 150. The peer leaf nodes are connected to the spine nodes in the spine layer, and the leaf nodes are also connected to a number of different information handling system nodes 105. Note that the border peer leaf nodes 115 connect to the spine layer and also connect to one or more outside networks, such as the Internet 130.

Because the peer leaf nodes are communicatively coupled together via one or more INL connections, there are fewer ports available for each leaf node to connect to an end node 105. Thus, this configuration creates at least the following limitations due to the peer-link between MC-LAG peer nodes. First, the overall bandwidth for incoming and outgoing data is reduced because at least one port is dedicated to connecting to the peer node. Second, such a configuration increases the cost because more leaf nodes are required to support a bandwidth demand. Finally, the scaling factor is also affected. Each time a network needs to expand or increase in scale, this deficit created by the loss of bandwidth between peer nodes multiplies.

Accordingly, what is needed are solutions that eliminate the need for peer node links, particularly in MC-LAG network environments.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 3 depicts a methodology for configuring sub-LAGs (link aggregation groups), according to embodiments of the present disclosure.

FIG. 4 depicts a methodology for handling south-to-north (or end-node-to-spine-layer) broadcast, unknown unicast, and multicast (BUM) data traffic from an orphaned or single-homed node, according to embodiments of the present disclosure.

FIG. 13 depicts a methodology for handling north-to-south (or spine-layer-to-end-node) broadcast, unknown unicast, and multicast (BUM) data traffic, according to embodiments of the present disclosure.

DETAILED DESCRIPTION OF EMBODIMENTS

Figure 1:
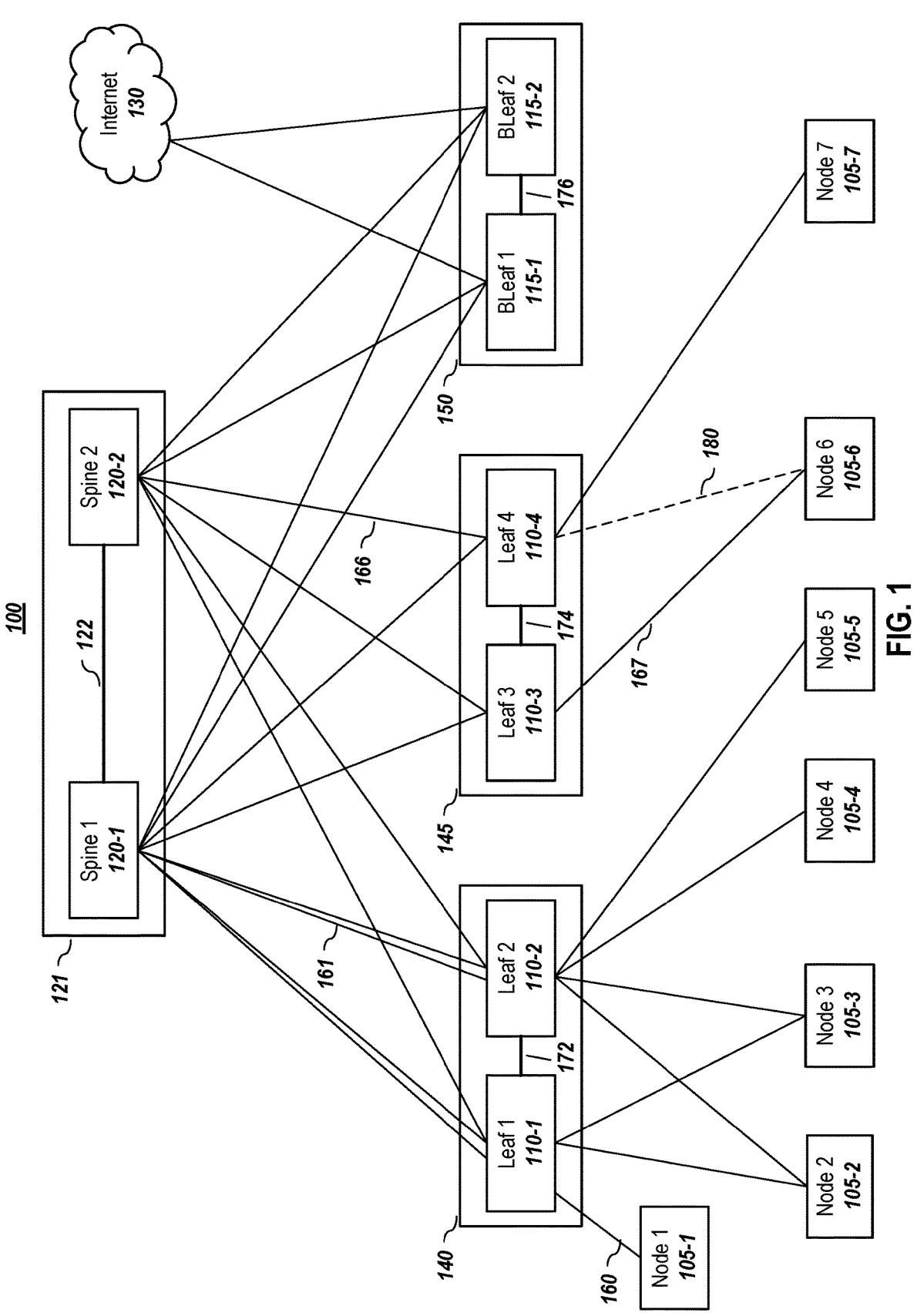
FIG. 1 illustrates a network comprising a spine layer, several pairs of leaf nodes, and several nodes connected thereto

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment.

Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any examples are provided by way of illustration to help elucidate embodiments. The examples shall not be construed or used to limit the scope of the present disclosure.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of MC-LAG network environments, aspects of the present disclosure are not so limited. Accordingly, the aspects of the present disclosure may be applied or adapted for use in other contexts.

A. General Overview

As noted above, current deployments, particularly L2 deployments that use multi-chassis link aggregation group (MC-LAG) implementations to achieve multi-homing connectivity for information handling systems, use inter-node links (INLs) (or inter-chassis link (ICLs) between peer nodes. Such links are beneficial. Consider, again, the network 100 depicted in FIG. 1.

Dual-Homed Nodes. Many of the nodes 105 are communicatively coupled to both leaf nodes in a set of peer leaf nodes. For example, Node 2 105-2 is connected to Leaf Node 1 110-1 and to Leaf Node 2 110-2. Such nodes may be referred to as "dual-homed" nodes. While many nodes typically are dual-homed nodes, that is not always the case.

Orphaned Nodes. Consider for example Node 1 105-1 at the far left of the network 100. This node 105-1 is connected only to Leaf Node 1 110-1. Such a node may be referred to as an "orphaned" node.

Single-Homed Nodes. Sometimes during operation, a dual-homed node may lose its connection to one of the peer leaf nodes. Consider, by way of illustration, Node 6 105-6. It was dual homed to Leaf Node 3 110-3 and Leaf Node 4 110-4. However, for some reason, it lost link 180 that communicatively coupled Node 6 to Leaf Node 4. As a result, Node 6 105-6 is only connected to Leaf Node 3. Such a node may be referred to as a "single-homed" node, which may be considered functionally equivalent to an orphaned node.

INL Usage for Orphaned and Single-Homed Nodes. Whether an orphaned node or a single-homed node, the INL connecting peer leaf nodes can be extremely important in order to correctly route data traffic. Consider, for example, data traffic that has been received at Spine Node 1 120-1 that is intended for Node 1. The spine layer sees the peer leaf nodes as a single logical node, and assume that Spine 1 sends the data traffic via link 161 to Leaf Node 2. Recall that Node 1 is an orphaned node that is only connected to Leaf Node 1—there is no direct egress to Node 1 from Leaf Node 2. Therefore, Leaf Node 2 sends the data traffic via the INL 172 to Leaf Node 1, which forwards the data traffic to the end recipient, Node 1. A similar situation may arise for Node 6 when it is a single-homed node. Data traffic intended for Node 6 that is sent via link 166 to Leaf Node 4 can no longer be sent directly from Leaf Node 4 to Node 6 because link 180 is down. Leaf Node 4 sends the data traffic via its INL 174 to its peer leaf node, Leaf Node 3, which egresses the data traffic via link 167 to Node 6. Thus, particularly in cases of orphaned or single-homed nodes, the INL serves a useful purpose.

However, as noted in the Background section (above), while the INL serves a useful purpose, it comes with costs. Those costs include reduced bandwidth, increased costs, and issues with scaling.

Consider a 1:1 L2 data center deployment with a leaf node with 32×100G links and 2×10G links. The bandwidth planning for leaf nodes may be as follows:

(1) MC-LAG with peer-link (i.e., INLs): This results in 40×25G downlinks, 10×100G uplinks, and 10×100G peer-links. In such a configuration, 40 servers can only be connected to a leaf node as the bandwidth has to be equally allocated across all peers.

(2) MC-LAG without peer-link (i.e., no INLs): There are more ports freed to be used to connect end nodes. This results in 64×25G downlink and 16×100G uplink (note that there are zero (0) peer links), 64 servers can be supported by fully utilizing the links.

Consider a 1:2 L2 data center deployment with a leaf node with 48×25G links, 2×200G links, and 4×100G links. The bandwidth planning for leaf nodes may be as follows:

(1) MC-LAG with peer-link (i.e., INLs): This results in 48×25G downlinks, 6×100G uplinks, and 2×100G peer-links). In such a configuration, 48 servers can only be connected from leaf nodes to satisfy 1:2 requirement, in case of uplink failure, over-subscription ratio can go up to 1:6, which can lead to overloading the peer leaf node.

(2) MC-LAG without peer-link (i.e., no INLs): This results in 52×25G downlinks and 7×100G uplinks (note that there are zero (0) peer links). In such a configuration, 52 servers can be supported by utilizing the available links.

Thus, these examples illustrate that, without peer-links, there are clear benefits to bandwidth utilization and scaling.

Not only are there benefits to bandwidth utilization and scaling, but such configurations can also reduce costs. Since there is an increase in the number of server/storage nodes being supported without MC-LAG peer-links, significant costs are saved. If there is no requirement to support additional server/storage nodes by utilizing the peer-links, removing the peer-link itself also saves the cost on optics and cables.

Accordingly, embodiments herein eliminate the link between peer nodes. At a high level, in one or more embodiments, the MC-LAG traffic forwarding decisions may be moved from the leaf nodes/leaf node layer to the spine nodes/spine node layer. In one or more embodiments, a spine node determines the port to reach a node—whether a dual-homed node, a single-homed node, or an orphaned node—that is connected to a leaf node based on information that has been learned from one or more leaf nodes. The spine nodes use this information to form sub-LAGs to specific leaf nodes to help facilitate data traffic handling, particularly to orphaned and single-homed nodes.

In one or more embodiments, an inter-node link (INL)/inter-chassis link (ICL) is used between spine nodes to sync sub-LAG MC-LAG information. In one or more embodiments, an egress mask is added in spine nodes to handle packets to get forwarded to an appropriate sub-LAG or sub-LAGs. If any sub-LAG is down, a corresponding peer sub-LAG may be enabled for forwarding the traffic received on the INL to a leaf node.

In one or more embodiments, apart from regular LAG creation in the spine nodes, a sub-LAG per leaf may be created to reach single-homed and/or orphaned nodes connected to leaf nodes. For example, a primary sub-LAG is formed for ports connected to one leaf node of a set of peer leaf nodes and a secondary sub-LAG is formed for ports connected to the other peer leaf node of the set of peer leaf nodes.

In one or more embodiments, each spine node and leaf node may learn connectivity information through control message synchronizing (e.g., via Inter-chassis Control Protocol daemon (ICCPd)). Via the control messages, the spine nodes and leaf nodes can learn whether an end node is dual homed, single homed, or orphaned.

In one or more embodiments, an indicator may be used to identify data traffic to or from an orphaned node or single-homed node. For example, an indicator, such as a CFI (canonical format indicator) bit in virtual local area network (VLAN) header, may be set when a BUM (broadcast, unknown unicast, and multicast) packet ingresses on an orphan port/single-homed port and exits on an uplink port in a leaf node. Upon receiving the BUM packet at the spine node with the indicator set, the spine node learns the MAC (media access control) on the sub-LAG and may reset the indicator in the packet.

In one or more embodiments, for BUM traffic, regular flooding at the spine layer still occurs as normal, but an additional copy may be sent to the peer sub-LAG if a single homed/orphan port exists in the leaf pair with an indicator set indicating that the traffic should be flooded to the single homed/orphaned port at the leaf node.

In one or more embodiments, any downlink failures in a leaf node are updated to the spine layer with list of MACs to change the egress port from a regular/parent LAG to a corresponding sub-LAG in order to redirect the traffic to a specific leaf node for faster convergence.

In one or more embodiments, a sub-LAG per leaf node may be added to the VLAN broadcast domain (if not present) in the spine nodes when there are any single-homed/orphaned nodes connected to the leaf node. Primary sub-LAG may be added to the VLAN broadcast domain by default instead of a parent LAG.

B. System and Method Embodiments

Figure 2:
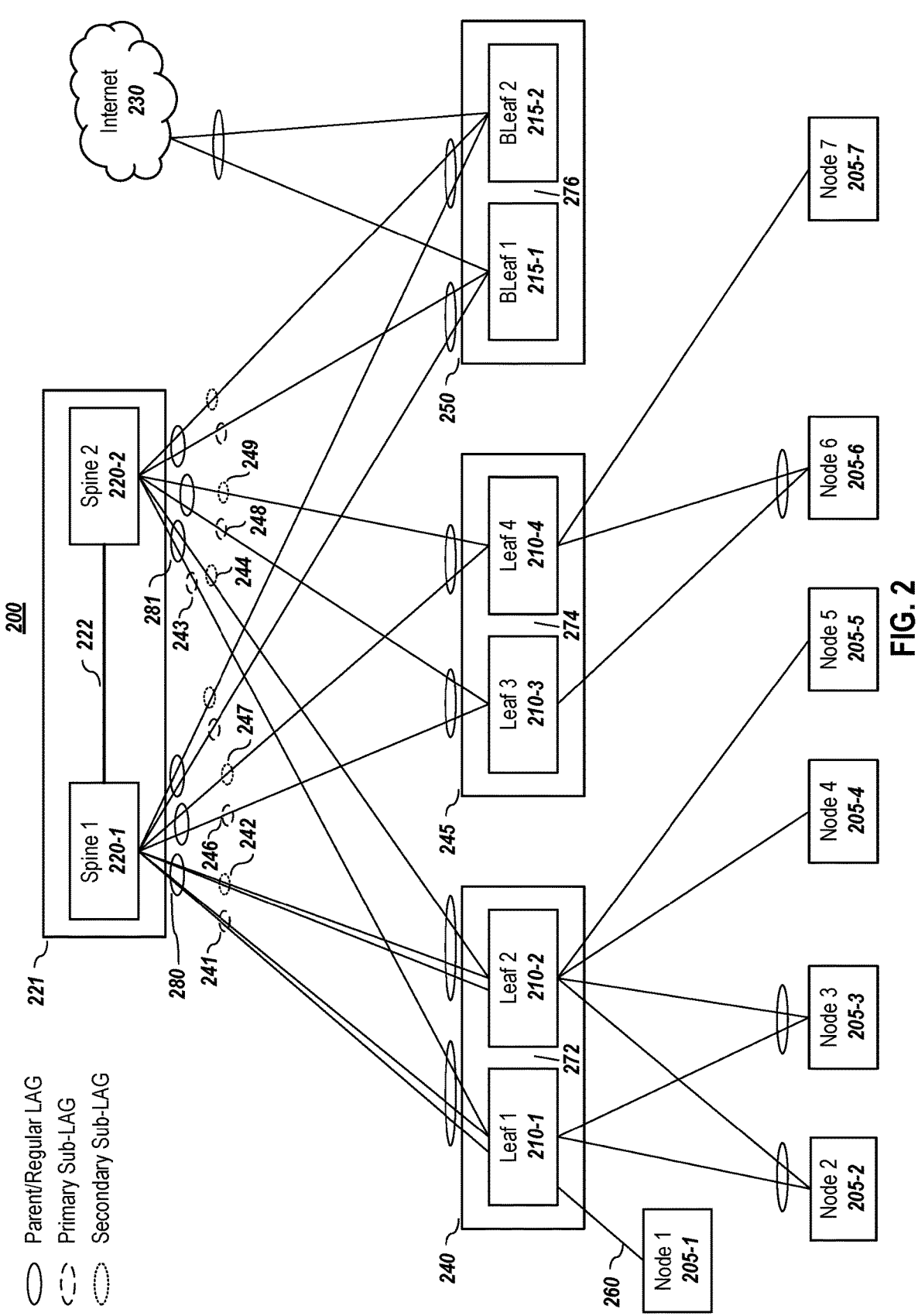
FIG. 2 depicts an example network configured according to embodiments of the present disclosure.

FIG. 2 depicts an example network configured according to embodiments of the present disclosure. The network 200 of FIG. 2 is similar to that depicted in FIG. 1; however, the peer leaf nodes 240, 245, and 250 do not have any inter-node links 272, 274, and 276, respectively. Also, as will be explained in more detail below, the network is also configured with additional primary and secondary sub-LAGs (e.g., sub-LAGs 241, 242, 246, 247, etc.) to address data traffic when single-homed or orphaned nodes exist in the network.

1. Embodiments of Sub-LAG Generation

FIG. 3 depicts a methodology for configuring sub-LAGs, according to embodiments of the present disclosure. In one or more embodiments, the leaf nodes 210/215 (e.g., exchange (305) information about connectivity (e.g., dual-homed connectivity) with nodes 205, such as servers or storage device, via one or more of the spine nodes 220. As mentioned above, the sharing of connectivity information may be done via ICCP messages.

In one or more embodiments, the leaf nodes also update (310) the spine nodes about the presence of any single-homed node or orphaned node. At least for any single-homed node or orphaned node that is applicable to a spine node, the spine node may configure (315) a primary sub-LAG (link aggregation group) and secondary sub-LAG from the spine node to the leaf node that has a single-homed node or orphaned node. It should be noted that the sub-LAGs may be created over time as single-homed/orphaned nodes are identified, they may all be created at an initialization phase, or a combination thereof.

Turning to FIG. 2, as the spine layer 221 is made aware of the topology/configuration of the nodes 205, the spine nodes configure primary sub-LAGs (e.g., primary sub-LAGs 241, 243, 246, 248, etc.) and corresponding secondary sub-LAGs (e.g., secondary sub-LAGs 242, 244, 247, 249, etc.). It should be noted that the network configuration may include one or more additional LAGs. For example, the spine nodes may create parent or regular LAGs (e.g., LAG 280) as normally done. And, the leaf nodes 210/215 and one or more of the end nodes 205 may also be configured with LAGs, which is typically done for dual-homed configurations and multi-link configurations.

2. Embodiments of Node-to-Spine-Layer BUM Data Traffic from an Orphaned or Single-Homed Node FIG. 4 depicts a methodology for handling south-to-north (or end-node-to-spine-layer) broadcast, unknown unicast, and multicast (BUM) data traffic from an orphaned or single-homed node, according to embodiments of the present disclosure. BUM data traffic is received (405) at a leaf node from an information handling system end node that is an orphaned or single-homed node (e.g., Node 1 205-1 in FIG. 2). In one or more embodiments, the receiving leaf node (in this example Leaf Node 1 210-1) recognizes that that BUM data traffic is from an orphaned/single-homed node and sets (410) an indicator (e.g., sets a VLAN CFI bit) prior to egressing on an uplink port to a spine node, and then the leaf node sends (415) the BUM data traffic with the indicator to a spine node (e.g., Spine Node 1 220-1 or Spine Node 2 220-2).

At the spine node, after receiving the BUM data traffic that has an indicator set that indicates that the end node connected to the leaf node that sent the BUM data traffic is an orphaned or single-homed node, the spine node (e.g., Spine Node 1 220-1) adds (420) the node's MAC address (i.e., Node 1) to a table correlating the MAC address to a corresponding sub-LAG (i.e., sub-LAG 241). In one or more embodiments, the receiving spine node may synchronize (425) this information with its peer spine node (i.e., Spine Node 2 220-2) so that the peer spine node may generate its own sub-LAG (if not already generated) (i.e., sub-LAG 243) and a corresponding MAC table entry.

In one or more embodiments, a determination is made (430), based upon configuration/table information at the spine layer whether there are any single-homed/orphan nodes connected to the peer leaf node (which together essentially form a single logical leaf node-like operation or system relative to the spine layer). Responsive to the peer leaf node (i.e., Leaf Node 2 210-2) not having any orphaned or single-homed nodes, the spine layer performs (435) regular flooding of the BUM data traffic with the indicator removed. However, responsive to the peer leaf node (i.e., Leaf Node 2 210-2) having any orphaned or single-homed nodes, the spine layer performs (440) regular flooding of BUM data traffic without an indicator but also sends BUM data traffic on a sub-LAG to the peer leaf node with an indicator set indicating that traffic needs to be flooded to any single homed/orphaned port at the peer leaf node. In one or more embodiments, the indicator may be the same indicator used previously when the leaf node sends data traffic to the spine layer, or it may be a different indicator.

In this example, Leaf Node 2 210-2 has two dual-homed nodes (Node 2 and Node 3) and two orphaned nodes, Node 4 and Node 5. Typically, there is an INL between the peer leaf nodes, so Leaf Node 2 would get the BUM data traffic directly from Leaf Node 1. Due to information shared via the INL, Leaf Node 2 would know that the two dual-homed nodes (Node 2 and Node 3) connected to Leaf Node 1 also received or will receive the BUM data traffic from Leaf Node 1. However, since no INL 272 exists between the peer leaf nodes, similar coordinating information is shared via the spine layer and via use of an indicator. Leaf Node 1 sends the BUM data traffic to its locally connected nodes (Node 2 and Node 3) and also sends the BUM data traffic with an indicator set to the spine layer. Upon receiving and recognizing that the data traffic is BUM data traffic with the indicator set, Leaf Node 2 knows to send the data traffic to its orphaned or single-homed nodes, namely Node 4 205-4 and Node 5 205-5. In one or more embodiments, the indicator may be removed by the peer leaf node before sending the data traffic to the orphaned and/or single-homed nodes.

Figure 5:
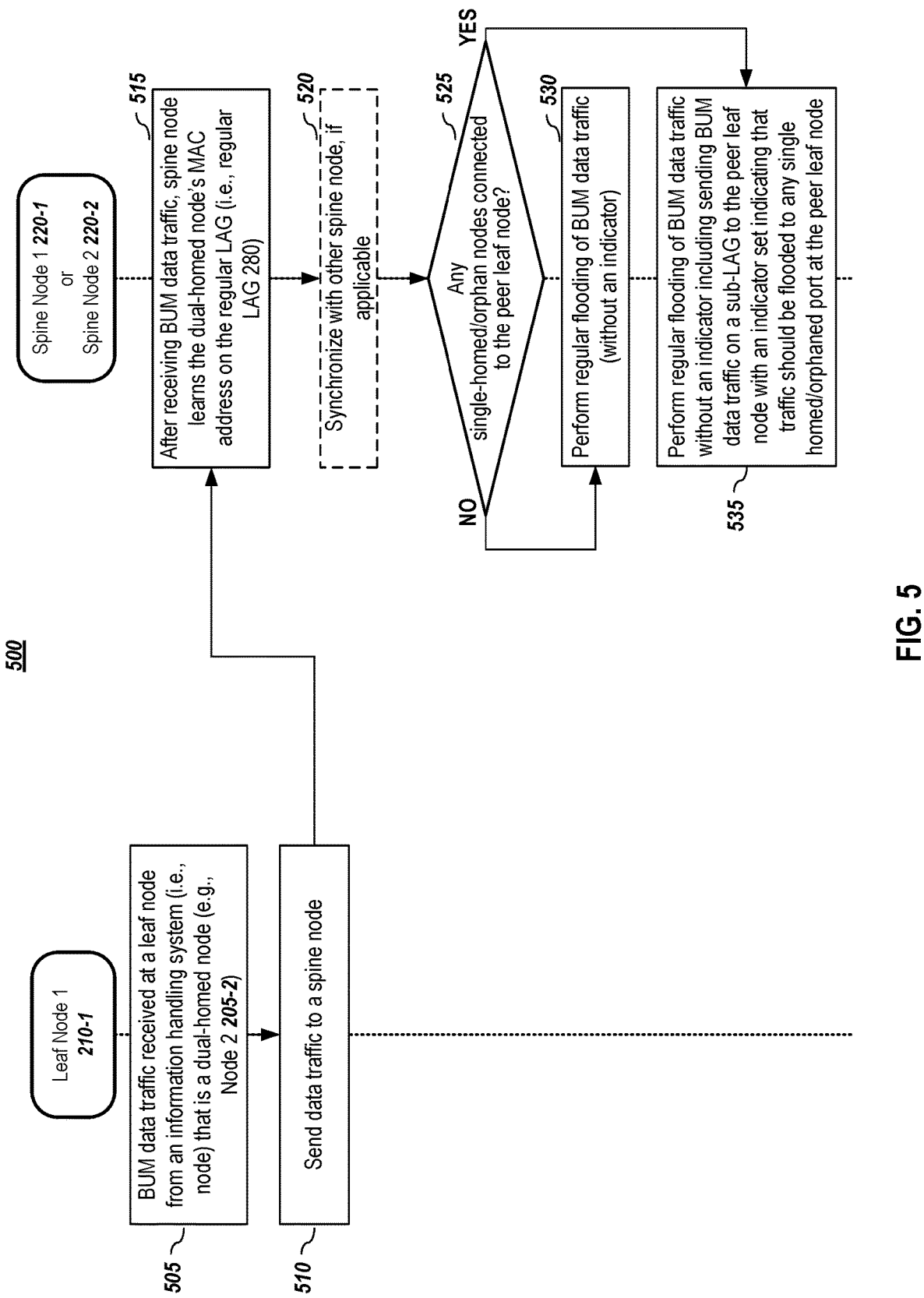
FIG. 5 depicts a methodology for handling south-to-north (or end-node-to-spine-layer) broadcast, unknown unicast, and multicast (BUM) data traffic from a dual-homed node, according to embodiments of the present disclosure.

3. Embodiments of Node-to-Spine-Layer BUM Data Traffic from a Dual-Homed Node FIG. 5 depicts a methodology for handling south-to-north (or end-node-to-spine-layer) broadcast, unknown unicast, and multicast (BUM) data traffic from a dual-homed node, according to embodiments of the present disclosure. BUM data traffic is received (505) at a leaf node from an information handling system end node that is a dual-homed node (e.g., Node 2 205-2 in FIG. 2). In one or more embodiments, the receiving leaf node (in this example Leaf Node 1 210-1) recognizes that that BUM data traffic is from a dual-homed node and processes the data traffic as normal (i.e., it does not set any additional indicator prior to egressing on an uplink port to a spine node indicating that it is a dual-homed node, although in one or more embodiments it may do so) by sending (510) the BUM data traffic to a spine node (e.g., Spine Node 1 220-1 or Spine Node 2 220-2).

At the spine node, after receiving the BUM data traffic, the spine node (e.g., Spine Node 1 220-1) knows that the node is a dual-home node and adds (515) the node's MAC address (i.e., Node 2) to a table correlating the MAC address to a corresponding regular or parent LAG (i.e., LAG 280). In one or more embodiments, the receiving spine node may synchronize (520) this information with its peer spine node (i.e., Spine Node 2 220-2) so that the peer spine node may generate its own parent/regular LAG (if not already generated) (i.e., LAG 281) and a corresponding MAC table entry.

In one or more embodiments, the spine layer operates in like manner as depicted in FIG. 4 at Steps 430-440. For example, in one or more embodiments, a determination is made (525) based upon configuration/table information at the spine layer whether there are any single-homed/orphan nodes connected to the peer leaf node. Responsive to the peer leaf node (i.e., Leaf Node 2 210-2) not having any orphaned or single-homed nodes, the spine layer simply performs (530) regular flooding of the BUM data traffic. However, responsive to the peer leaf node (i.e., Leaf Node 2 210-2) having any orphaned or single-homed nodes, the spine layer performs (535) regular flooding of BUM data traffic but also sends BUM data traffic on a sub-LAG to the peer leaf node with an indicator set indicating that the BUM data traffic is to be flooded to any single homed/orphaned port at the peer leaf node.

In this example, Leaf Node 1, which received the BUM data traffic from dual-homed Node 2, may send the BUM data traffic to its locally connected nodes (i.e., Node 1 and Node 3) and also sends the BUM data traffic to the spine layer. Upon receiving and recognizing that the data traffic is BUM data traffic with the indicator set, Leaf Node 2 sends the data traffic to its orphaned or single-homed nodes, namely Node 4 205-4 and Node 5 205-5. In one or more embodiments, the indicator may be removed by the peer leaf node before sending to the orphaned or single-homed nodes.

4. Embodiments of Handling Loss/Gain of a Node-to-Leaf-Node Connectivity a. Lost Connectivity

Figure 6:
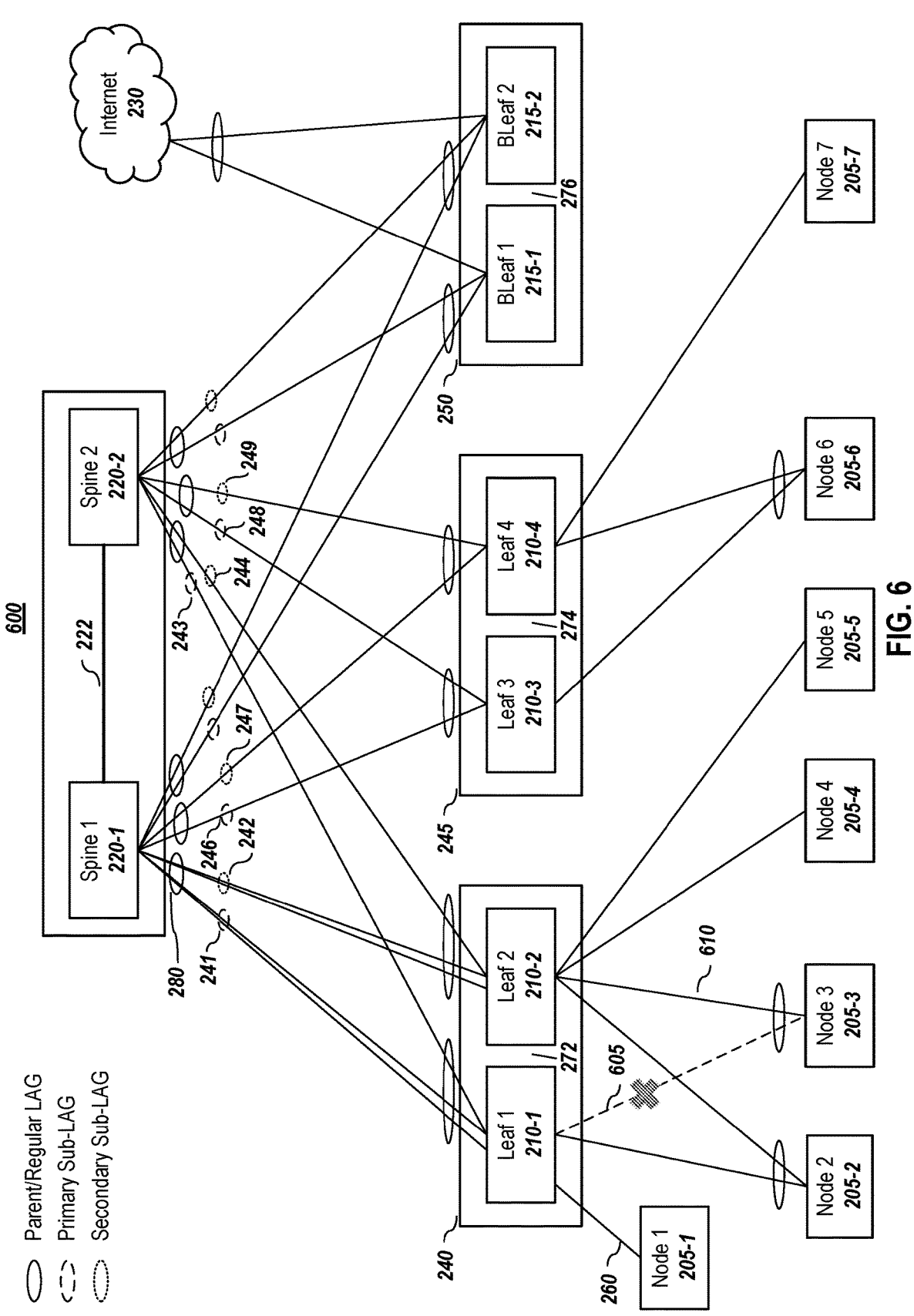
FIG. 6 depicts the network of FIG. 2 in which a node (Node 3 205-3) lost connectivity to a leaf node (Leaf Node 1 210-1) due to a down link or non-operational port.
Figure 7:
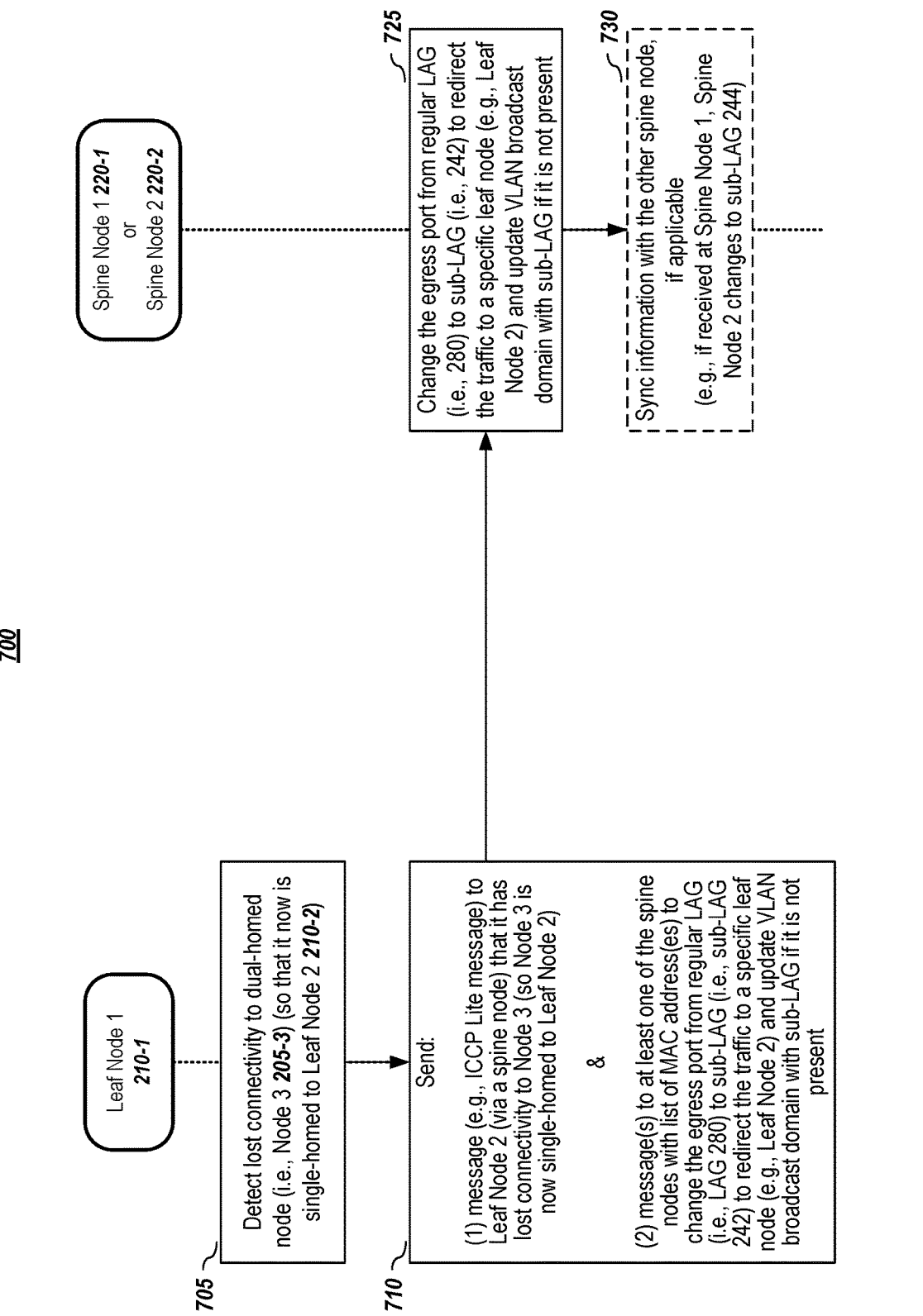
FIG. 7 depicts a methodology for handling cases in which a node loses connectivity to a leaf node, according to embodiments of the present disclosure.

FIG. 7 depicts a methodology for handling cases in which a node loses connectivity to a leaf node, according to embodiments of the present disclosure. For sake of illustration, FIG. 6 depicts the network of FIG. 2 in which Node 3 205-3 lost connectivity 605 to Leaf Node 1 210-1 due to a down link or non-operational port.

A leaf node (in this example, Leaf Node 1) detects (705) that it has lost connectivity to dual-homed node (i.e., Node 3 205-3) (so that it now is single-homed to Leaf Node 2 210-2). In one or more embodiments, Leaf Node 1 sends (710): (1) a message or messages (e.g., ICCP Lite message) to its peer leaf node (in this example, Leaf Node 2) via a spine node that it has lost connectivity to Node 3—so Node 3 is now single-homed to Leaf Node 2; and (2) a message or messages to at least one of the spine nodes 220 with list of MAC address(es) to change the egress port from regular LAG (e.g., LAG 280) to sub-LAG (e.g., sub-LAG 242) to redirect the traffic to a specific leaf node (i.e., Leaf Node 2).

In one or more embodiments, the spine node changes (715) the egress port from the regular LAG (e.g., LAG 280 for Spine Node 1) to sub-LAG (e.g., sub-LAG 242 for Spine Node 1) to redirect the traffic to a specific leaf node—namely Leaf Node 2, so that traffic can be sent via link 610 to Node 3.

Note that, in one or more embodiments, the receiving spine node may synchronize or share (720) this information with the other spine node, if applicable (i.e., Spine Node 2 changes from LAG 281 to sub-LAG 244) for Node 3.

In one or more embodiments, the spine node(s) may also update a VLAN broadcast domain with the sub-LAG, if it is not present.

Note that data traffic handling may proceed as described with respect to FIG. 4, FIG. 5, and FIG. 13 with Node 3 being treated as a single-homed node.

b. Gained/Regained Connectivity

Figure 8:
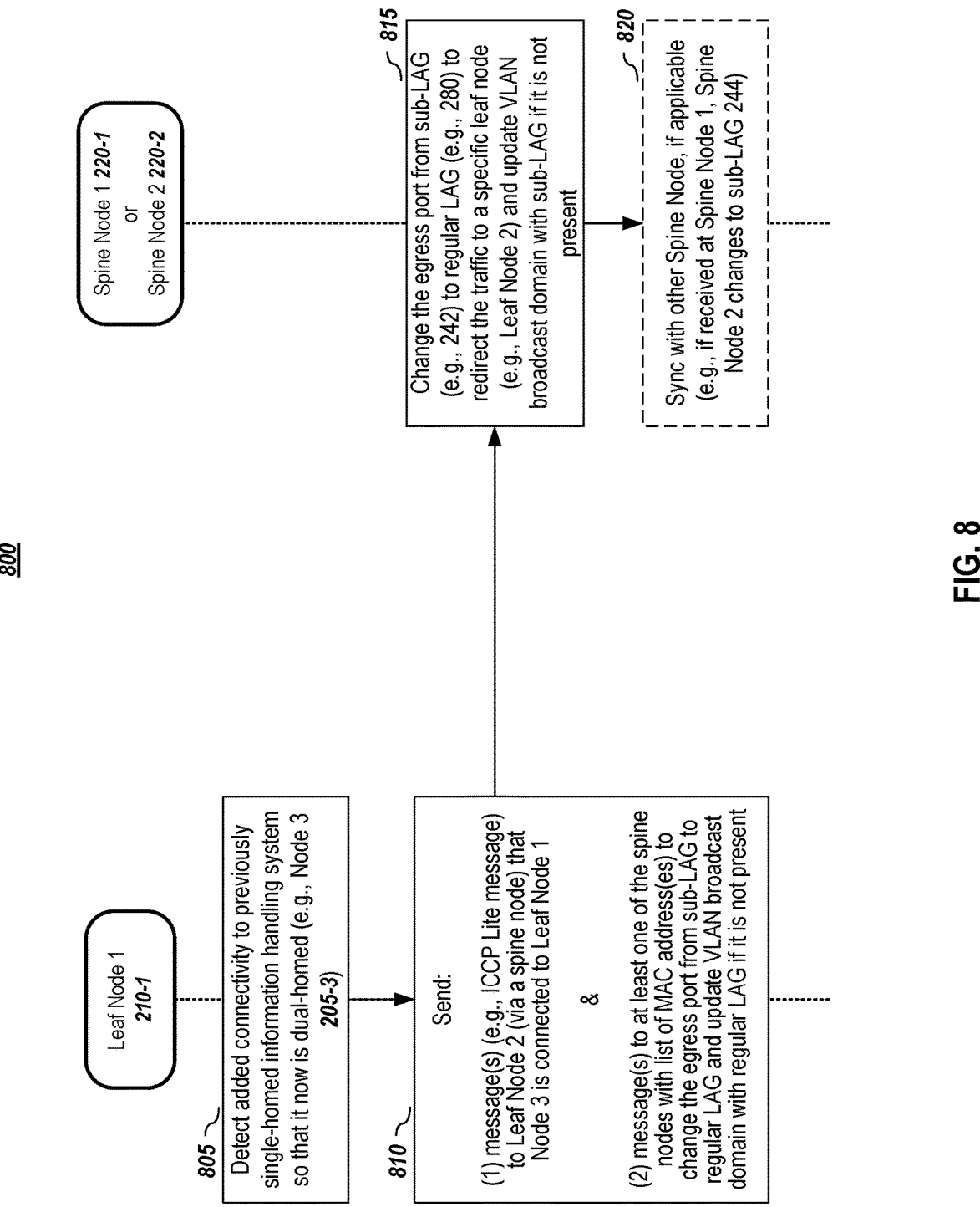
FIG. 8 depicts a methodology for handling cases in which a node gains or regains connectivity to a leaf node, according to embodiments of the present disclosure.

FIG. 8 depicts a methodology for handling cases in which a node gains connectivity to a leaf node, according to embodiments of the present disclosure. For example, by way of illustration, consider the case in which Node 3 regains its link 605 to Leaf Node 1.

In this example, Leaf Node 1 detects (805) that it has gained connectivity to Node 3. In one or more embodiments, Leaf Node 1 sends (810): (1) a message or messages (e.g., ICCP Lite message) to its peer leaf node (in this example, Leaf Node 2) via a spine node that it has gained connectivity to Node 3—so Node 3 is now dual-homed to Leaf Nodes 1 & 2; and (2) a message or messages to at least one of the spine nodes 220 with list of MAC address(es) to change the egress port from the sub-LAG (e.g., sub-LAG 242) to the regular LAG (e.g., LAG 280).

In one or more embodiments, the spine node changes (815) the egress port from the sub-LAG (e.g., LAG 242 for Spine Node 1) to the regular LAG (e.g., parent LAG 280 for Spine Node 1).

Note that, in one or more embodiments, the receiving spine node may synchronize or share (820) this information with the other spine node, if applicable, so that it may update its configuration accordingly (i.e., Spine Node 2 changes from sub-LAG 244 to LAG 281 for Node 3).

In one or more embodiments, the spine node(s) may also update a VLAN broadcast domain with the regular LAG, if it is not present.

Note that data traffic handling may proceed as described with respect to FIG. 4, FIG. 5, and FIG. 13 with Node 3 being treated as a dual-homed node.

5. Embodiments of Handling Loss/Gain of a Leaf-Node-to-Spine-Node Connectivity a. Lost Connectivity

Figure 9:
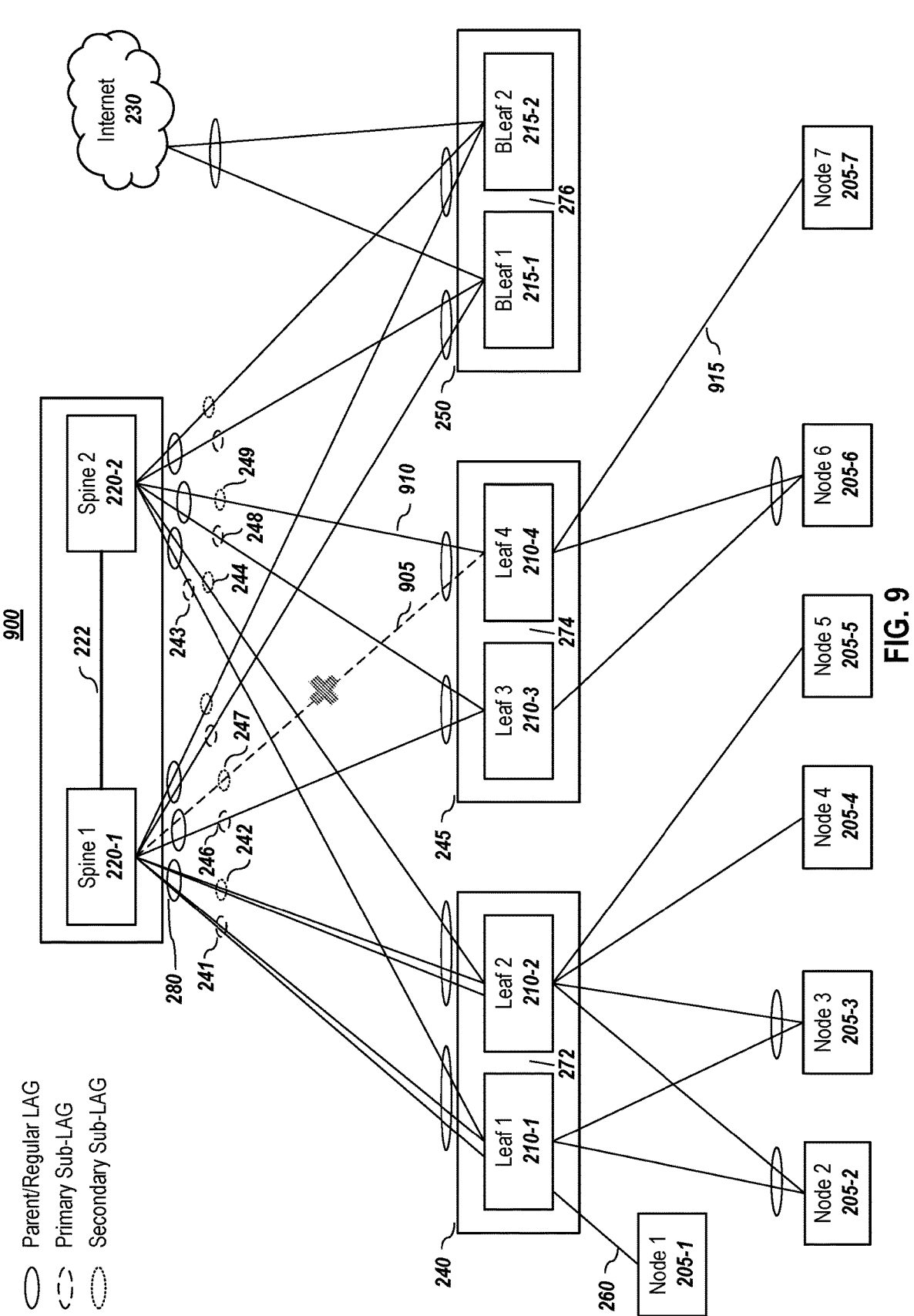
FIG. 9 depicts the network of FIG. 2 in which a leaf node (Leaf Node 4 210-4) lost connectivity to a spine node (Spine Node 1 220-1) due to a down link or non-operational port.
Figure 10:
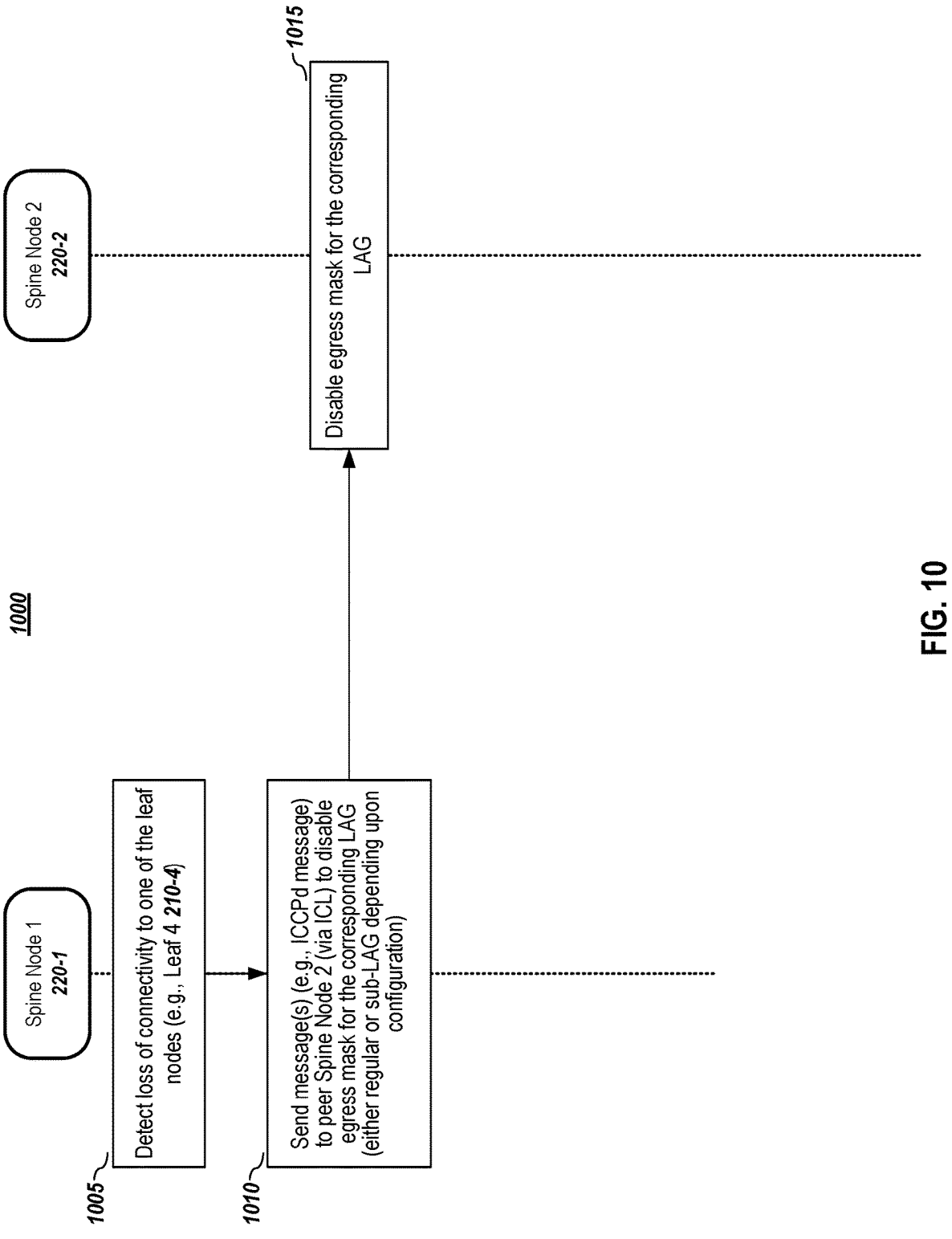
FIG. 10 depicts a methodology for handling cases in which a leaf node loses connectivity to a spine node, according to embodiments of the present disclosure.

FIG. 10 depicts a methodology for handling cases in which a leaf node loses connectivity to a spine node, according to embodiments of the present disclosure. For sake of illustration, FIG. 9 depicts the network of FIG. 2 in which Leaf Node 4 210-4 lost connectivity 905 to Spine Node 1 220-1 due to a down link or non-operational port.

In one or more embodiments, a spine node (in this example, Spine Node 1) detects (1005) that it has lost connectivity to a leaf node (Leaf Node 4 in this example). Spine Node 1 sends (1010) one or more messages (e.g., ICCPd message(s)) to its peer spine node, Spine Node 2, via the INL to disable the egress mask for the corresponding LAG, which may be a regular LAG or a sub-LAG depending upon configuration. In response to receiving the message, Spine Node 2 disables (1015) the egress mask for the corresponding LAG.

b. Handling Data Traffic

Figure 11:
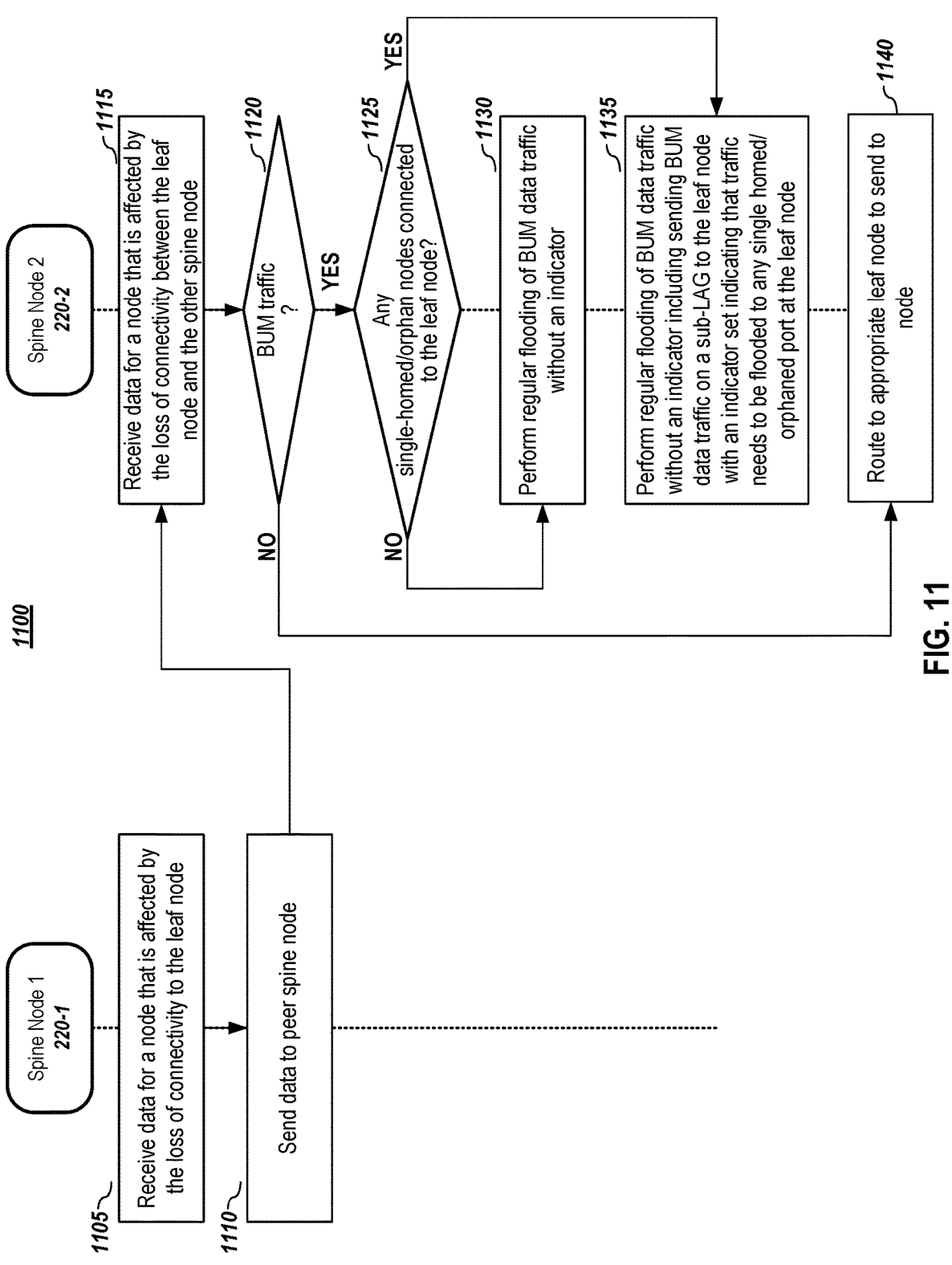
FIG. 11 depicts a methodology for handling data traffic in cases in which a leaf node has lost connectivity to a spine node, according to embodiments of the present disclosure.

FIG. 11 depicts a methodology for handling data traffic in cases in which a leaf node has lost connectivity to a spine node, according to embodiments of the present disclosure. For this scenario, assume that the spine node, Spine Node 1, has received (1105) data for a node that is affected by the loss of connectivity to the leaf node. Note that this data traffic may be intended specifically for such a node or may be broadcast data traffic, such as BUM data traffic. In one or more embodiments, the spine node sends (1110) the data traffic to its peer spine node, Spine Node 2. Spine Node 2 receives (1115), via the INL, the data traffic for a node that is affected by the loss of connectivity between the leaf node and the other spine node.

In one or more embodiments, the spine node determines (1120) whether the data traffic is BUM data traffic.

If the data traffic is not BUM traffic, such as unicast traffic intended for a specific end node (assume Node 7 205-7 for the sake of this illustration), the spine node routes (1140) the data traffic to the leaf node that can reach the intended recipient node, Node 7. In this example, Spine Node 2 sends the data traffic on sub-LAG 249 (via link 910) to reach Leaf Node 4, which in turn sends the data traffic on link 915 to Node 7.

If the data traffic is BUM traffic, in one or more embodiments, the spine layer operates in a similar manner as depicted in FIG. 4 at Steps 430-440 or FIG. 5 at Steps 525-535. For example, in one or more embodiments, a determination is made (1125) based upon configuration/table information at the spine layer whether there are any single-homed/orphan nodes connected to either leaf node. Responsive to a leaf node not having any orphaned or single-homed nodes, the spine layer simply performs (1130) regular flooding of the BUM data traffic (without any indicator). However, responsive to a leaf node (i.e., Leaf Node 4) having any orphaned or single-homed nodes, the spine layer performs (1135) regular flooding of BUM data traffic but also sends BUM data traffic on a sub-LAG to the leaf node with an indicator set indicating that the BUM data traffic is to be flooded to any single-homed/orphaned port (i.e., link 915 for Node 7) at the leaf node. Note that in this example, Spine Node 2 needs only to send data traffic to Leaf Node 4 (and not to Leaf Node 3) because all end nodes for these peer leaf nodes 245 are reachable via Leaf Node 4. Note also that, in one or more embodiments, the spine node may send only the BUM data traffic with an indicator set and the receiving leaf node knows to perform regular flooding with the BUM data traffic, including flooding to any single-homed/orphaned ports.

c. Gained/Regained Connectivity

Figure 12:
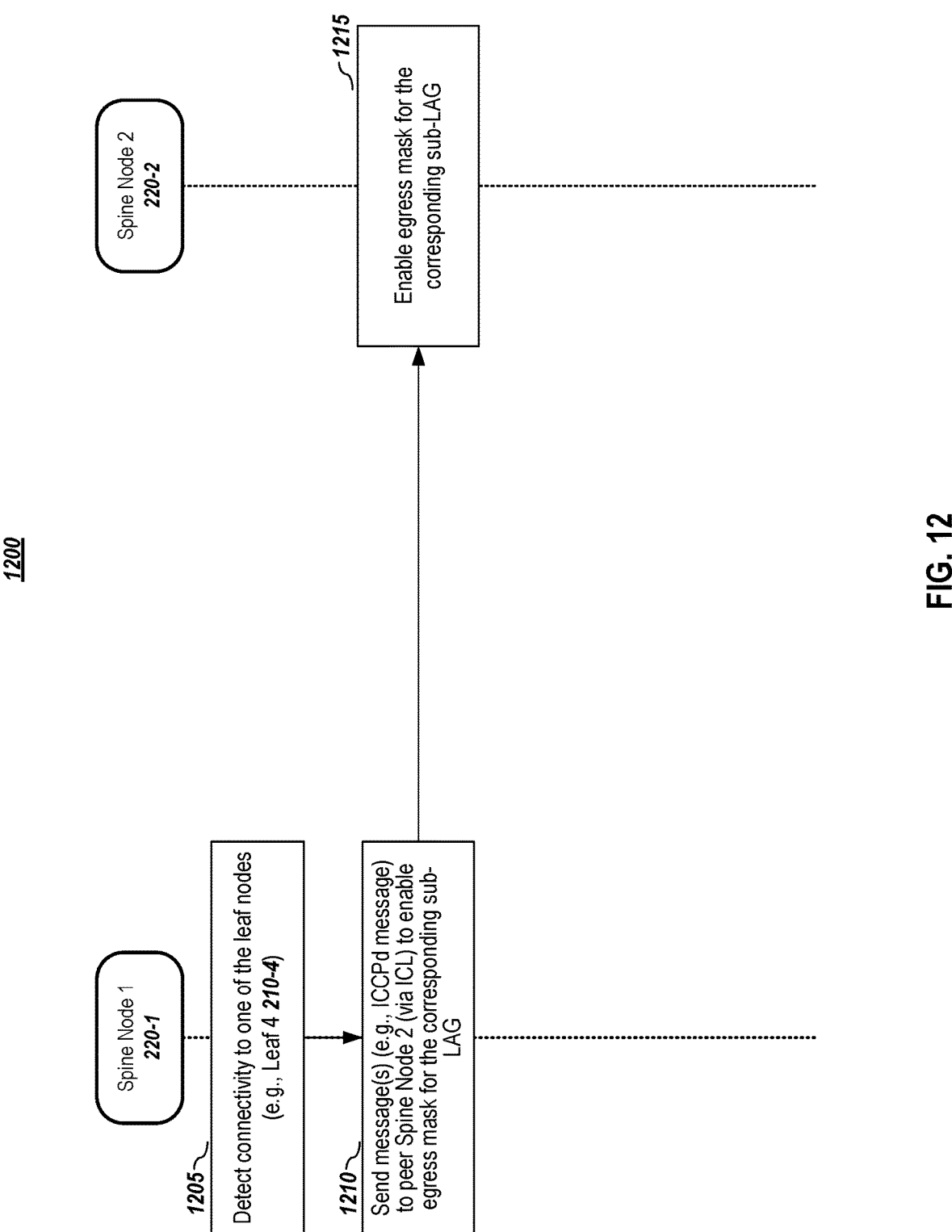
FIG. 12 depicts a methodology for handling cases in which a spine node gains connectivity to a leaf node, according to embodiments of the present disclosure.

FIG. 12 depicts a methodology for handling cases in which a spine node gains connectivity to a leaf node, according to embodiments of the present disclosure. For sake of illustration, assume that Spine Node 1 220-1 has regained connectivity to Leaf Node 4 210-4.

In one or more embodiments, a spine node (in this example, Spine Node 1) detects (1205) that it has gained/ regained connectivity to a leaf node (Leaf Node 4 in this example). Spine Node 1 sends (1210) one or more messages (e.g., ICCPd message(s)) to its peer spine node, Spine Node 2, via the INL to enable an egress mask for the corresponding LAG. In response to receiving the message, Spine Node 2 enables (1215) an egress mask for the corresponding LAG.

Note that data traffic handling may proceed as described in this patent document (e.g., FIG. 4, FIG. 5, FIG. 11, and FIG. 13) depending upon the configuration and data traffic.

6. Embodiments of Spine-Layer-to-Node Data Traffic

FIG. 13 depicts a methodology for handling north-to-south (or spine-layer-to-end-node) broadcast, unknown unicast, and multicast (BUM) data traffic, according to embodiments of the present disclosure. In one or more embodiments, BUM data traffic is received (1305) at a spine node from another rack or network (e.g., from the Internet 230 via a border leaf node 215).

In one or more embodiments, the spine layer operates in a similar manner, at least in part, as depicted in FIG. 4, FIG. 5, or FIG. 11. For example, in one or more embodiments, a determination is made (1310) based upon configuration/table information at the spine layer whether there are any single-homed/orphan nodes connected to leaf nodes.

Responsive to a leaf node not having any orphaned or single-homed nodes, the spine layer simply performs (1315) regular flooding of the BUM data traffic (without any indicator).

However, responsive to a leaf node having any orphaned or single-homed nodes, the spine layer performs (1320) regular flooding of BUM data traffic but also sends BUM data traffic on a sub-LAG to such a leaf node with an indicator set indicating that the BUM data traffic is to be flooded to any single homed/orphaned port at that leaf node. Note also that, in one or more embodiments, step 1320 may comprise the spine node only sending the BUM data traffic with an indicator set and the receiving leaf node knows to perform regular flooding with the BUM data traffic, including flooding to any single homed/orphaned ports.

7. Embodiments of Handling Known Unicast Data Traffic

It should be noted that, in one or more embodiments, known unicast traffic for south-to-north data traffic (i.e., Node→Leaf→Spine data flow) may be processed with no special handling; regular Layer 2 (L2) forwarding-based FDB (forwarding database) table may be used. Similarly, known unicast traffic for north-to-south data traffic (i.e., Spine→Leaf→Node data flow) may be processed with no special handling; regular Layer 2 (L2) forwarding-based FDB (forwarding database) table may be used.

8. Additional Embodiments

In one or more embodiments, for virtual machines (VMs) that are moved (e.g., VM moves from server within a rack or across a rack), no special handling is required. When a VM moves from a server within a rack or across a rack, leaf nodes learn about the MAC move, and the spine nodes also learn of the MAC move for proper forwarding.

In one or more embodiments, when the packet arrives at a leaf node or a spine node that does not have the MAC entry in the FDB table for forwarding, regular L2 flooding occurs for MAC learning and forwarding.

C. System Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 14:
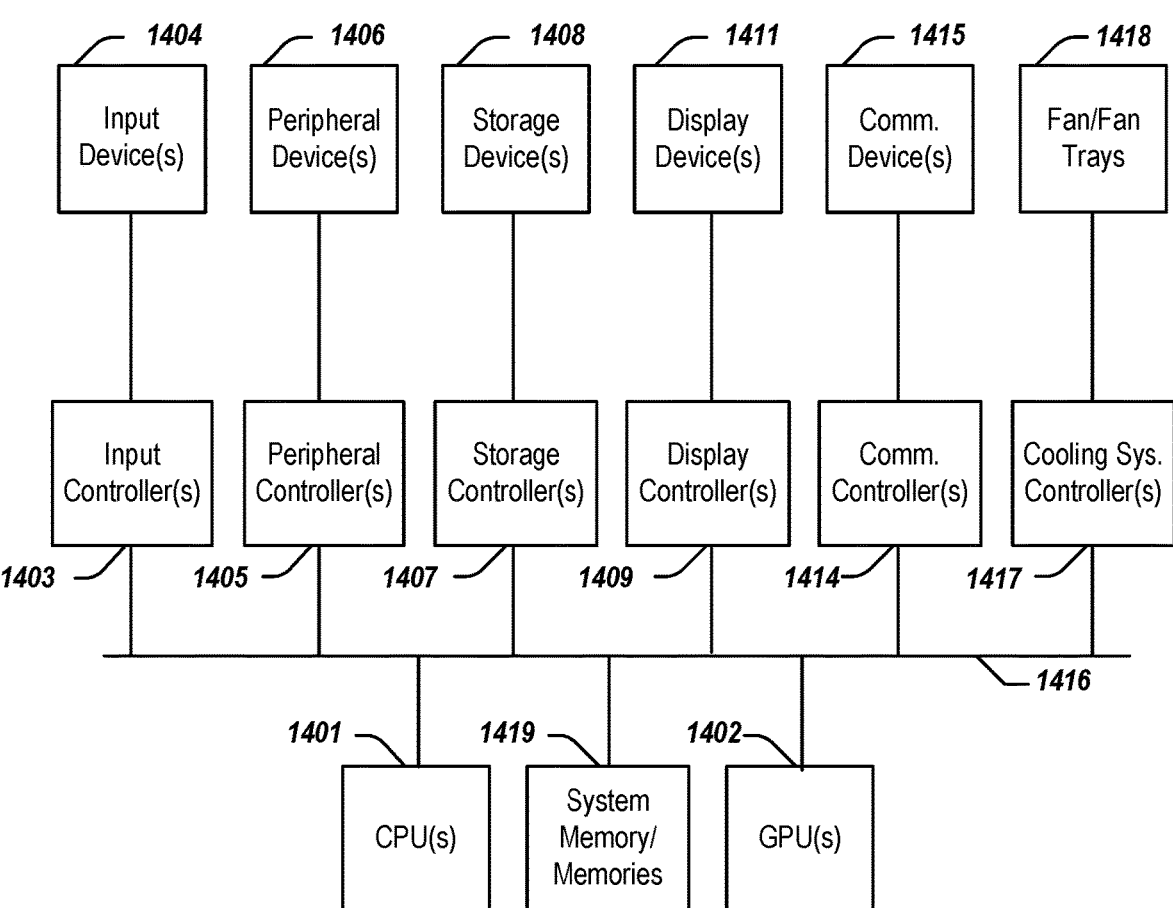
FIG. 14 depicts a simplified block diagram of an information handling system, according to embodiments of the present disclosure.

FIG. 14 depicts a simplified block diagram of an information handling system (or computing system), according to embodiments of the present disclosure. It will be understood that the functionalities shown for system 1400 may operate to support various embodiments of a computing system—although it shall be understood that a computing system may be differently configured and include different components, including having fewer or more components as depicted in FIG. 14.

As illustrated in FIG. 14, the computing system 1400 includes one or more CPUs 1401 that provides computing resources and controls the computer. CPU 1401 may be implemented with a microprocessor or the like and may also include one or more graphics processing units (GPU) 1402 and/or a floating-point coprocessor for mathematical computations. In one or more embodiments, one or more GPUs 1402 may be incorporated within the display controller 1409, such as part of a graphics card or cards. The system 1400 may also include a system memory 1419, which may comprise RAM, ROM, or both.

A number of controllers and peripheral devices may also be provided, as shown in FIG. 14. An input controller 1403 represents an interface to various input device(s) 1404, such as a keyboard, mouse, touchscreen, stylus, microphone, camera, trackpad, display, etc. The computing system 1400 may also include a storage controller 1407 for interfacing with one or more storage devices 1408 each of which includes a storage medium such as magnetic tape or disk, or an optical medium that might be used to record programs of instructions for operating systems, utilities, and applications, which may include embodiments of programs that implement various aspects of the present disclosure. Storage device(s) 1408 may also be used to store processed data or data to be processed in accordance with the disclosure. The system 1400 may also include a display controller 1409 for providing an interface to a display device 1411, which may be a cathode ray tube (CRT) display, a thin film transistor (TFT) display, organic light-emitting diode, electroluminescent panel, plasma panel, or any other type of display. The computing system 1400 may also include one or more peripheral controllers or interfaces 1405 for one or more peripherals 1406. Examples of peripherals may include one or more printers, scanners, input devices, output devices, sensors, and the like. A communications controller 1414 may interface with one or more communication devices 1415, which enables the system 1400 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1400 comprises one or more fans or fan trays 1418 and a cooling subsystem controller or controllers 1417 that monitors thermal temperature(s) of the system 1400 (or components thereof) and operates the fans/fan trays 1418 to help regulate the temperature.

In the illustrated system, all major system components may connect to a bus 1416, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 15:
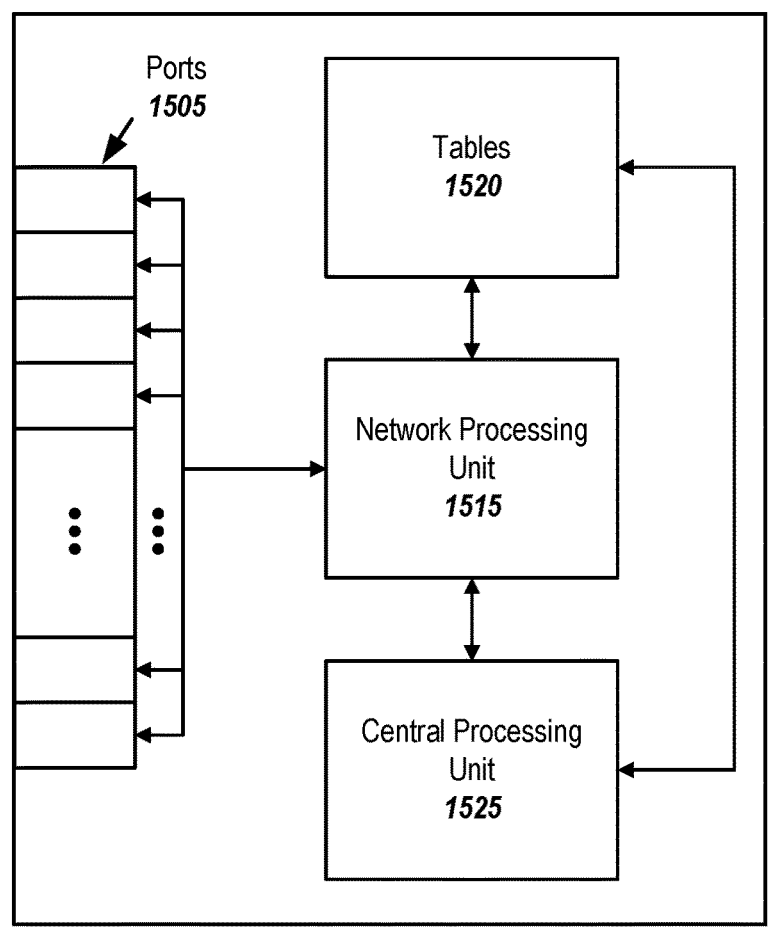
FIG. 15 depicts an alternative block diagram of an information handling system, according to embodiments of the present disclosure.

FIG. 15 depicts an alternative block diagram of an information handling system, according to embodiments of the present disclosure. It will be understood that the functionalities shown for system 1500 may operate to support various embodiments of the present disclosure—although it shall be understood that such system may be differently configured and include different components, additional components, or fewer components.

The information handling system 1500 may include a plurality of I/O ports 1505, a network processing unit (NPU) 1515, one or more tables 1520, and a CPU 1525. The system includes a power supply (not shown) and may also include other components, which are not shown for sake of simplicity.

In one or more embodiments, the I/O ports 1505 may be connected via one or more cables to one or more other network devices or clients. The network processing unit 1515 may use information included in the network data received at the node 1500, as well as information stored in the tables 1520, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim or claims may be arranged differently including having multiple dependencies, configurations, and combinations.

What is claimed is:

1. A computer-implemented method comprising:
given peer leaf nodes comprising at least a pair of leaf nodes that are not connected via an inter-node link (INL) and are coupled to a spine layer comprising at least a pair of spine nodes that are coupled together via an INL:
obtaining connectivity information from the peer leaf nodes regarding nodes that are coupled to at least one of the leaf nodes of the peer leaf nodes; and
at the spine layer, for each leaf node of the peer leaf nodes that comprises at least one orphaned or single-homed node connected to the leaf node, assigning a primary sub-LAG (link aggregation group) and a secondary sub-LAG.

2. The computer-implemented method of claim 1 further comprising:
receiving, at a spine node via a leaf node from the peer nodes, BUM (broadcast, unknown unicast, or multicast) data traffic that has an indicator set that indicates that a source of the BUM data traffic is an orphaned or single-homed node connected to the leaf node; and
adding the orphaned or single-homed node's MAC (media access control) address to a table correlating the MAC address to a sub-LAG.

3. The computer-implemented method of claim 2 further comprising:
responsive to an orphaned or single-home node being connected to the peer leaf node of the leaf node that sent the BUM data traffic, performing regular flooding of the BUM data traffic without an indicator and also sending the BUM data traffic on the sub-LAG to the peer leaf node with an indicator, which indicates to the peer leaf node that the BUM data traffic is to be flooded to the orphaned or single-home node coupled to the peer leaf node; and
responsive to no orphaned or single-home nodes being connected to the peer leaf node of the leaf node that sent the BUM data traffic, performing regular flooding of the BUM data traffic without an indicator.

4. The computer-implemented method of claim 1 further comprising:
receiving, at a spine node via a leaf node from the peer nodes, BUM (broadcast, unknown unicast, or multicast) data traffic that does not have an indicator set, which indicates that a source of the BUM data traffic is a dual-homed node connected to each of the leaf nodes in the peer leaf nodes and is not an orphaned or single-homed node connected to the leaf node; and
adding the dual-homed node's MAC (media access control) address to a table correlating the MAC address to a parent LAG.

5. The computer-implemented method of claim 4 further comprising:
responsive to an orphaned or single-home node being connected to the peer leaf node of the leaf node that sent the BUM data traffic, performing regular flooding of the BUM data traffic without an indicator and also sending the BUM data traffic on the sub-LAG to the peer leaf node with an indicator, which indicates to the peer leaf node that the BUM data traffic is to be flooded to the orphaned or single-home node coupled to the peer leaf node; and
responsive to no orphaned or single-home nodes being connected to the peer leaf node of the leaf node that sent the BUM data traffic, performing regular flooding of the BUM data traffic without an indicator.

6. The computer-implemented method of claim 1 further comprising:

receiving, at a spine node, a message related to a leaf node from the peer leaf nodes having lost connectivity to a node in which the message comprises a list of one or more MAC addresses to change egress from a sub-LAG to a regular LAG; and if applicable, synchronizing with the other spine node in the spine layer.

7. The computer-implemented method of claim 1 further comprising:

detecting, at a spine node, loss of connectivity to one of the leaf nodes of the peer leaf nodes; and notifying the peer spine node at the spine layer to disable an egress mask for a LAG or sub-LAG corresponding to the leaf node for which connectivity was lost by the spine node.

8. The computer-implemented method of claim 7 further comprising:

detecting, at the spine node, connectivity to the leaf node of the peer leaf nodes; and notifying the peer spine node at the spine layer to enable an egress mask for a LAG or sub-LAG corresponding to the leaf node for which connectivity was restored.

9. The computer-implemented method of claim 1 further comprising:

receiving BUM data traffic at a spine node; and performing typical flooding of the BUM data traffic to the peer leaf nodes with an exception that, responsive to an orphaned or single-home node being connected to a leaf node of the peer leaf nodes, sending the BUM data traffic to the leaf node on a sub-LAG to the leaf node with an indicator, which indicates to the leaf node that the BUM data traffic is to be flooded to the orphaned or single-home node coupled to the leaf node.

10. A computer-implemented method comprising:

for a leaf node of peer leaf nodes comprising at least a pair of leaf nodes that are not connected via an inter-node link (INL) and are coupled to a spine layer comprising at least a pair of spine nodes that are coupled together via an INL, performing steps comprising:

exchanging, via at least one of the spine nodes, connectivity information related to node information handling systems that are coupled to the leaf nodes of the peer leaf nodes; and responsive to the leaf node identifying a node information handling system that is connected to the leaf node as being a single-homed or orphaned node, setting an indicator in BUM (broadcast, unknown unicast, or multicast) data traffic that is received from the single-homed or orphaned node and sent to a spine node in the spine layer, in which the indicator indicates to the spine node that the node information handling system that sent the BUM data traffic to the leaf node is a single-homed or orphaned node for that leaf node and that the spine node is to associate, via assignment to a sub-LAG (link aggregation group), a MAC (media access control) address associated with that single-homed or orphaned node with a port at the spine node that connects to that leaf node.

11. The computer-implemented method of claim 10 further comprising:

responsive to the leaf node losing all connectivity to a node information handling system that was connected to the leaf node, notifying at least one spine node in the spine layer that the leaf node lost connectivity to have at least one of the spine nodes in the spine layer change an egress port from a regular LAG to a sub-LAG to redirect data traffic to a specific leaf node associated with the sub-LAG.

12. The computer-implemented method of claim 11 further comprising:

responsive to the leaf node gain connectivity to the node information handling system, notifying at least one spine node in the spine layer that the leaf node lost connectivity to have at least one of the spine nodes in the spine layer change an egress port from the sub-LAG to the regular LAG.

13. The computer-implemented method of claim 10 further comprising:

receiving BUM data traffic at the leaf node; and responsive to the BUM data traffic having an indicator set, which indicates that the leaf node is to send the BUM data traffic to any orphaned or single-home node coupled to the leaf node.

14. An information handling system for operating as a spine node with at least one other information handling system also operating as a spine node, which comprise a spine layer, the information handling system comprising:

one or more ports for connecting to the other spine node in the spine layer via an inter-node link (INL) and for connecting to peer leaf nodes comprising at least a pair of leaf nodes that are not connected via an inter-node link (INL); and one or more processors for processing data traffic received via at least one of the one or more ports; and a non-transitory computer-readable medium or media comprising one or more sets of instructions which, when executed by at least one of the one or more processors, causes steps to be performed comprising:

obtaining connectivity information from the peer leaf nodes regarding nodes that are coupled to at least one of the leaf nodes of the peer leaf nodes; and for each leaf node of the peer leaf nodes that comprises at least one orphaned or single-homed node connected to the leaf node, assigning a primary sub-LAG (link aggregation group) and a secondary sub-LAG.

15. The information handling system of claim 14 wherein the non-transitory computer-readable medium or media further comprises one or more sequences of instructions which, when executed by at least one of the one or more processors, causes steps to be performed comprising:

receiving, at a spine node via a leaf node from the peer nodes, BUM (broadcast, unknown unicast, or multicast) data traffic that has an indicator set that indicates that a source of the BUM data traffic is an orphaned or single-homed node connected to the leaf node; and adding the orphaned or single-homed node's MAC (media access control) address to a table correlating the MAC address to a sub-LAG.

16. The information handling system of claim 15 wherein the non-transitory computer-readable medium or media further comprises one or more sequences of instructions which, when executed by at least one of the one or more processors, causes steps to be performed comprising:

responsive to an orphaned or single-home node being connected to the peer leaf node of the leaf node that sent the BUM data traffic, performing regular flooding of the BUM data traffic without an indicator and also sending the BUM data traffic on the sub-LAG to the peer leaf node with an indicator, which indicates to the peer leaf node that the BUM data traffic is to be flooded to the orphaned or single-home node coupled to the peer leaf node; and responsive to no orphaned or single-home nodes being connected to the peer leaf node of the leaf node that sent the BUM data traffic, performing regular flooding of the BUM data traffic without an indicator.

17. The information handling system of claim 14 wherein the non-transitory computer-readable medium or media further comprises one or more sequences of instructions which, when executed by at least one of the one or more processors, causes steps to be performed comprising:

receiving, at a spine node via a leaf node from the peer nodes, BUM (broadcast, unknown unicast, or multicast) data traffic that does not have an indicator set, which indicates that a source of the BUM data traffic is a dual-homed node connected to each of the leaf nodes in the peer leaf nodes and is not an orphaned or single-homed node connected to the leaf node; and adding the dual-homed node's MAC (media access control) address to a table correlating the MAC address to a parent LAG.

18. The information handling system of claim 17 wherein the non-transitory computer-readable medium or media further comprises one or more sequences of instructions which, when executed by at least one of the one or more processors, causes steps to be performed comprising:

responsive to an orphaned or single-home node being connected to the peer leaf node of the leaf node that sent the BUM data traffic, performing regular flooding of the BUM data traffic without an indicator and also sending the BUM data traffic on the sub-LAG to the peer leaf node with an indicator, which indicates to the peer leaf node that the BUM data traffic is to be flooded to the orphaned or single-home node coupled to the peer leaf node; and responsive to no orphaned or single-home nodes being connected to the peer leaf node of the leaf node that sent the BUM data traffic, performing regular flooding of the BUM data traffic without an indicator.

19. The information handling system of claim 14 wherein the non-transitory computer-readable medium or media further comprises one or more sequences of instructions which, when executed by at least one of the one or more processors, causes steps to be performed comprising:

receiving, at a spine node, a message related to a leaf node from the peer leaf nodes having lost connectivity to a node in which the message comprises a list of one or more MAC addresses to change egress from a sub-LAG to a regular LAG; and if applicable, synchronizing with the other spine node in the spine layer.

20. The information handling system of claim 14 wherein the non-transitory computer-readable medium or media further comprises one or more sequences of instructions which, when executed by at least one of the one or more processors, causes steps to be performed comprising:

receiving BUM data traffic at a spine node; and performing typical flooding of the BUM data traffic to the peer leaf nodes with an exception that, responsive to an orphaned or single-home node being connected to a leaf node of the peer leaf nodes, sending the BUM data traffic to the leaf node on a sub-LAG to the leaf node with an indicator, which indicates to the leaf node that the BUM data traffic is to be flooded to the orphaned or single-home node coupled to the leaf node.

* * * * *